E. E. WICKERSHAM.
TRAILER WAGON.
APPLICATION FILED AUG. 13, 1918.
1,386,978.
Patented Aug. 9, 1921.
3 SHEETS—SHEET 1.
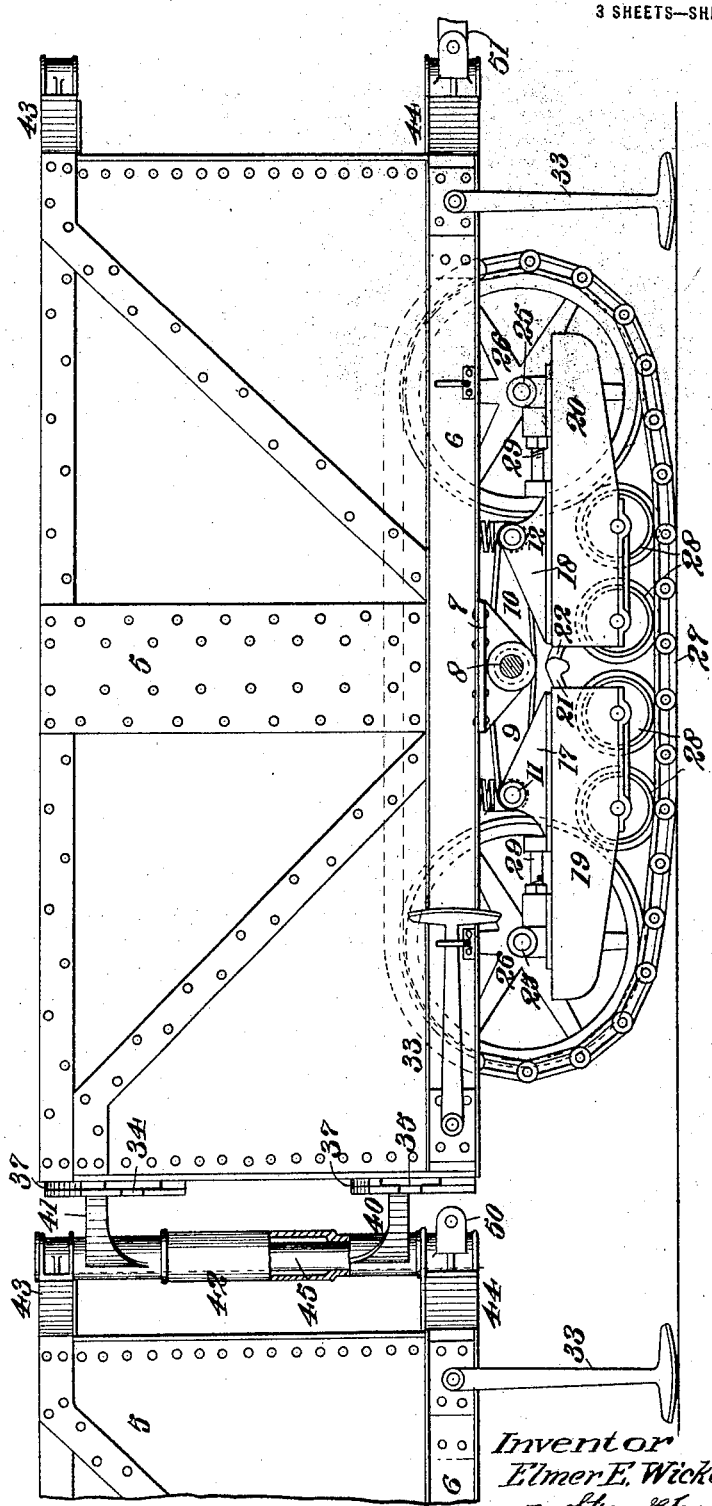

E. E. WICKERSHAM.
TRAILER WAGON.
APPLICATION FILED AUG. 13, 1918.
1,386,978.
Patented Aug. 9, 1921.
3 SHEETS—SHEET 2.
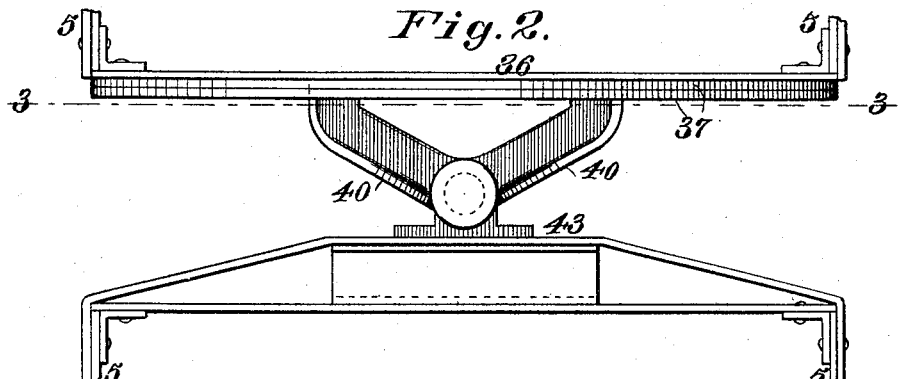
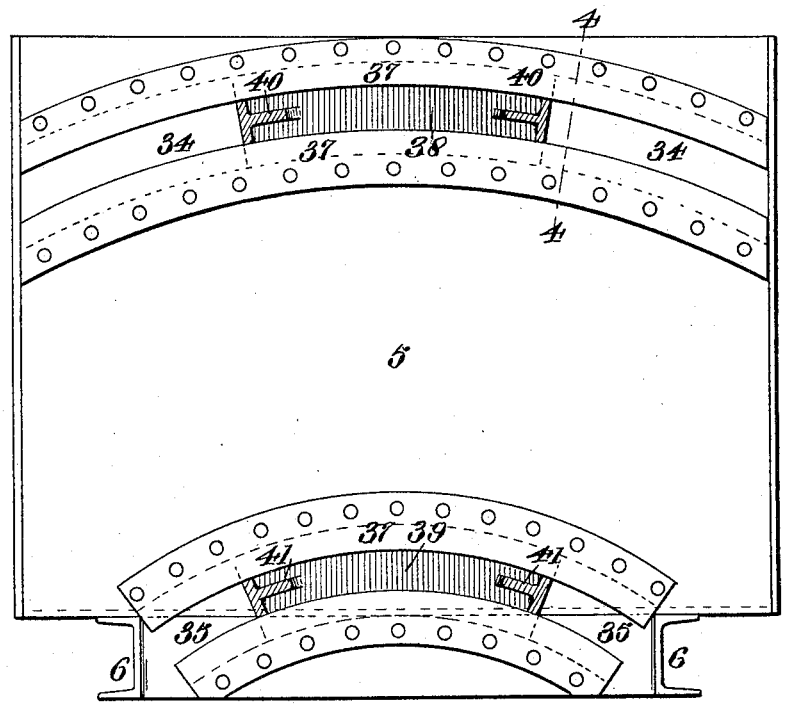
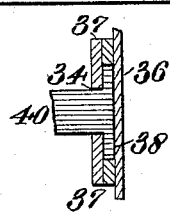
Inventor.
Elmer E. Wickersham
By Strong & Townsend
Attys

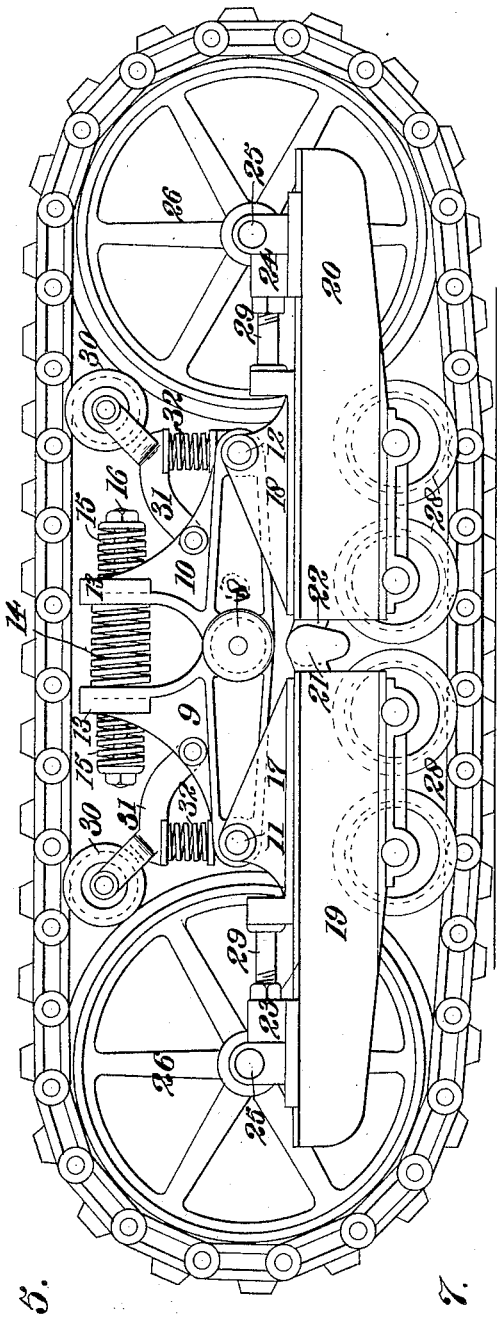

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRAILER-WAGON.

1,386,978.   Specification of Letters Patent.   Patented Aug. 9, 1921.

Application filed August 13, 1918. Serial No. 249,612.

*To all whom it may concern:*

Be it known that I, ELMER E. WICKERSHAM, a citizen of the United States, residing at Stockton, in the county of San Joaquin and State of California, have invented new and useful Improvements in Trailer-Wagons, of which the following is a specification.

This invention relates to a vehicle construction and particularly pertains to a trailer wagon.

It is the principal object of this invention to provide a trailer wagon having separate self-laying track trucks with a yieldable connection by which it may be drawn by a tractor and which will insure that a full drawbar rod may be carried and pulled by the connecting mechanism without restricting the movement of the trailer and thus allowing it to conform to the contour of the roadway over which it passes.

The invention contemplates the use of self-laying track units of the construction shown in my co-pending application entitled "Auto tractor," bearing the Serial Number 250,932, filed Aug. 22, 1918. These units are free to move at opposite sides of the wagon body and support this body as it is connected to a tractor by means of a universally movable draw-bar which slidably engages the trailer and allows it to have lateral and radial movement in relation to the path of travel of the tractor.

Referring more particularly to the drawings:

Figure 1 is a view in side elevation, illustrating the completely assembled trailer wagon, its running gear and connecting draw-bar.

Fig. 2 is a fragmentary view in plan, illustrating the manner in which the draw-bar is interposed between the tractor and trailer.

Fig. 3 is a view in section and elevation as seen on the line 3—3 of Fig. 2, disclosing the curved tracks for the draw-bar.

Fig. 4 is a view in section as seen on the line 4—4 of Fig. 3, illustrating the manner in which the draw-bar is slidably disposed within one of the guides.

Fig. 5 is an enlarged view in side elevation, illustrating one of the truck units.

Fig. 6 is a view in plan, illustrating the structure disclosed in Fig. 5.

Fig. 7 is an enlarged view in plan, disclosing the connection between the articulated truck frame sections.

In the drawings, 5 indicates the body of a trailer wagon. This structure as here shown is rectangular and has opposite vertical ends. The body is formed integral with a main frame 6, with which the ends are rigidly secured. Positioned directly beneath the main frame, midway the length of the body and secured thereto, are hangers 7. These members are fitted with central bearings through which a connecting axle 8 is supported. The opposite ends of this axle project outwardly from the sides of the vehicle body and extend through hinge blocks 9 and 10. The bearing portions of these blocks are divided and disposed in spaced relation to each other, so that they may intermesh and form a composite bearing through which the ends of the axle 8 extend.

The hinge blocks are substantially triangular in shape, having a base portion, at one corner of which the axle bearings are formed and at the other lower corners of which hanger pins 11 and 12 are positioned. The remaining parts of the structure extend upwardly and are formed with spring pads 13. These pads are substantially parallel and provide supports for central cushion springs 14 and outer recoil springs 15. These springs are arranged as shown in Fig. 6, the central group being held together by a spring bolt 16. Due to this arrangement relative movement of the two hinge blocks in relation to each other will cause expansion or contraction of all of these springs and thus cushion the action of the members depending from the hanger pins 11 and 12. The pins 11 and 12 engage hanger brackets 17 and 18 which are securely fixed to the upper faces of truck roller frames 19 and 20. In this manner the roller frames are dependent from the pins 11 and 12 and may swing throughout a vertical plane.

In order to hold the two frames in longitudinal alinement their contiguous ends are provided with guide lugs 21 and 22. These lugs intermesh and are free to slide in relation to each other. The roller frames 19 and 20 carry slidable bearings 23 and 24 at their opposite ends. These bearings rotatably support axles 25 of track chain idler wheels 26, one set of which is mounted at each end of the truck unit. These idler wheels carry an articulated chain track 27, upon which load-supporting rollers 28 rest. The rollers 28 are suitably housed within bearings upon the lower faces of the roller frames 19 and 20. The axle bearings 23 and 24 are provided with adjusting screws 29 which allow the slack in the chain to be taken up, when desired.

In order to further support the upper run of the chain in case it becomes loose, supporting rollers 30 are disposed beneath the chain and are carried by oscillating support arms 31. These arms are pivoted from the hinge blocks 9 and 10 and are yieldably supported by springs 32.

As the trailer body 5 is free to swing upon the axle 8 it is desirable to support the opposite ends by means of pivoted legs 33. These members are fitted with feet which afford a broad bearing surface and will hold the vehicle body in equilibrium upon its axle. The opposite ends of the vehicle body are provided with complementary couplings, as particularly shown in Fig. 1. One end is fitted with concentric arcuate guideways 34 and 35. These guideways consist of a flat bearing plate 36 upon which are fastened retaining plates 37. The retaining plates are arcuate and are spaced from each other to form a passageway along which the shoes 38 and 39 of a connecting member may slide. The radii of the guideways are coincident with the vertical axis of the vehicle body and the roadway, thus insuring that any sliding movement of the shoes 38 and 39 will be in a path of travel radial from the center between the two tracks on the roadway. The shoes 38 and 39 are formed at the outer ends of arms 40 and 41. These arms extend outwardly to rigidly brace the shoes, as shown in Fig. 2, and are cast integral with the upper and lower ends of a sleeve 42. The sleeve 42 is substantially the length of the height of the vehicle body and is interposed between connecting brackets 43 and 44. These brackets have bearings which are in vertical alinement and which accommodate a central pivot pin 45 extending vertically through the bearings of the two brackets and the sleeve 42.

In operation, the trailer may be connected to a tractor or a similar trailer. For convenience the first vehicle will be termed a tractor and it will be understood that the brackets 43 and 44 may be applied to it as well as to the body of a trailer. The connection between the two vehicles is made by bringing the sleeve 42 carried by arms 40 and 21 and indirectly by the trailer into register with the bearings in the members 43 and 44 of the tractor. The pivot pin 45 is then placed through these alined bearings and there secured.

As the tractor passes along the roadway, it will thus draw the trailer and any variation which occurs in the lateral alinement of the roadway will be accommodated by the sliding movement of the shoes 38 and 39 within the guides 34 and 35. This variation will allow the shoes to swing with the tractor without tilting the trailer. In case a turn is to be made, the trailer will pivot from the pin 45, irrespective of the relation of the vertical axis of the trailer body as considered with the shoes 38 and 39. It will therefore be understood that the two vehicles will be flexibly united, when turning a curve, even though the roadway is not perfectly level under both of the vehicles at one time.

As the trailer travels the flexible mounting of the load-supporting rollers 28 will permit the chain tracks to be deflected to conform to the contour of the roadway. This deflection of the chain will separately swing the roller frame members 19 and 20 around their hanger pins 11 and 12 and excessive swinging movement will cause the hinge blocks 9 and 10 to pivot around the axles and thus absorb the vibration and transmit it to the springs 14 and 15.

It will thus be seen that by the structure here disclosed a trailer and tractor may be flexibly united and the latter drawn by the tractor without twisting the trailer body, irrespective of whether the two vehicles are pursuing a curved path of travel or are traveling over unequally rough roads. The structure also provides that the trailer wagon will have a sufficient bearing surface to retard its movement, and that it will have ample tractive force to hold it upon the roadway without slippage.

Having thus described my invention, what I claim and desire to secure by Letters Patent is—

1. A coupling for trailer wagons comprising a vertical post, vertically spaced draw bars carried pivotally thereby, and connecting means for the draw bars with the trailer whereby the latter may incline laterally with respect to the draft vehicle.

2. A trailer connection comprising a vertically supported shaft carried by a tractor, a draw-bar horizontally pivoted thereon, and slidable connections between the draw-bar and a trailer whereby the trailer may incline laterally in relation to the tractor without restriction by the coupling.

3. A trailer coupling comprising a pair of fixed brackets secured in spaced relation to each other upon a tractor, a shaft vertically secured by these brackets, a draw-bar pivoted upon the shaft and between the brackets, spaced arms extending rearwardly from the draw-bar, and arm-engaging means upon a trailer whereby the trailer may incline laterally in relation to the tractor.

4. In a trailer coupling, a vertically supported pin adapted to be carried by a tractor, a tubular sleeve rotatably mounted upon said pin, a pair of spaced arms formed integral with said sleeve and extending rearwardly therefrom, and arcuate plates adapted to separately engage said spaced arms and permit the arms and plates to swing in relation to each other along an arc having the road bed as its center.

5. A trailer coupling comprising a pair of spaced brackets adapted to be fixed to a tractor, a pivot pin secured in vertical alinement by said brackets, a sleeve interposed between the brackets and rotatably mounted upon the pin, a pair of rearwardly extending arms formed integral with the top and bottom of the bracket, enlarged shoe plates formed at the outer ends of the arms and in vertical alinement with each other, said plates describing concentric arcs having for their center a point on the roadway equidistant between the traction elements of the trailer, and guide plates adapted to engage said shoes and along which they are free to swing, said plates being fixed to the forward end of the trailer.

6. A draft coupling for vehicles, comprising one or more transversely extending guides carried by one of the vehicles and curved in a vertical plane on an arc struck from the roadbed as a center, and connecting means pivotally mounted on the other vehicle on a vertical axis and working slidably in said guide for the purpose stated.

7. In combination with a trailer having a chain track truck mechanism and a body mounted thereon on a transverse axle permitting rocking movement of the truck mechanism and also of the body in a vertical plane independent of each other, and a draft coupling for the trailer operative to maintain the trailer body against rocking movement normally, and automatically adjustable to permit the trailer to tilt laterally with respect to the draft vehicle whereby to conform to irregularities in the contour of the roadbed, said draft coupling being connected to the trailer for arcuate movement in a transverse plane and to the draft vehicle for pivotal movement on a vertical axis.

In testimony whereof I have hereunto set my hand in the presence of two subscribing witnesses.

ELMER E. WICKERSHAM.

Witnesses:
JOHN H. HERRING,
W. W. HEALEY.